United States Patent
Mizokami et al.

(10) Patent No.: US 6,930,896 B2
(45) Date of Patent: Aug. 16, 2005

(54) POWER REGENERATION CIRCUIT AND POWER CONVERSION SYSTEM

(75) Inventors: Takao Mizokami, Okayama (JP); Yuuzo Matsushita, Wakayama (JP)

(73) Assignee: Omron Corporation, Kyoto (JP)

( * ) Notice: Subject to any disclaimer, the term of this patent is extended or adjusted under 35 U.S.C. 154(b) by 23 days.

(21) Appl. No.: 10/615,395

(22) Filed: Jul. 9, 2003

(65) Prior Publication Data

US 2004/0076023 A1 Apr. 22, 2004

(30) Foreign Application Priority Data

Jul. 16, 2002 (JP) ........................................ 2002-206714

(51) Int. Cl.[7] .................. H02M 3/335; H02M 7/538
(52) U.S. Cl. .................................. 363/24; 363/134
(58) Field of Search ........................... 363/15, 16, 24, 363/25, 26, 55, 56.06, 56.08, 95, 97, 131, 133, 134

(56) References Cited

U.S. PATENT DOCUMENTS

| 4,276,588 | A |   | 6/1981  | McLyman et al. |
|-----------|---|---|---------|----------------|
| 4,336,587 | A |   | 6/1982  | Broettcher, Jr. et al. |
| 4,853,836 | A |   | 8/1989  | Furuhashi |
| 4,928,220 | A | * | 5/1990  | White ................ 363/21.1 |
| 5,162,982 | A |   | 11/1992 | Mentler |
| 5,181,160 | A | * | 1/1993  | Okamoto et al. ........... 363/97 |
| 5,598,324 | A |   | 1/1997  | Imamura et al. |
| 6,239,993 | B1| * | 5/2001  | Fraidlin et al. ......... 363/56.03 |
| 6,314,006 | B1| * | 11/2001 | Berberich et al. ........... 363/25 |
| 6,333,861 | B1|   | 12/2001 | Goodman |
| 6,657,873 | B2| * | 12/2003 | Igarashi ...................... 363/17 |

FOREIGN PATENT DOCUMENTS

DE          35 37 536 A       4/1987

OTHER PUBLICATIONS

Patent Abstracts of Japan, vol. 007, No. 127, "Switching Regulator," (P–201), Jun. 03, 1983.

* cited by examiner

*Primary Examiner*—Matthew V. Nguyen
(74) *Attorney, Agent, or Firm*—Foley & Lardner LLP

(57) ABSTRACT

A first charge/discharge element is connected in parallel to a coil porion of the primary coil of a converter transformer. A second charge/discharge element is connected in parallel to a coil portion of the primary coil. The first charge/discharge element is charged with the energy stored in the primary coil when the first switching element turns off. A smoothing capacitor is charged with the charge energy when the second switching element turns off. The second charge/discharge element is charged with the energy stored in the primary coil when the second switching element turns off. The smoothing capacitor is charged with the charge energy when the first switching element turns off.

6 Claims, 8 Drawing Sheets

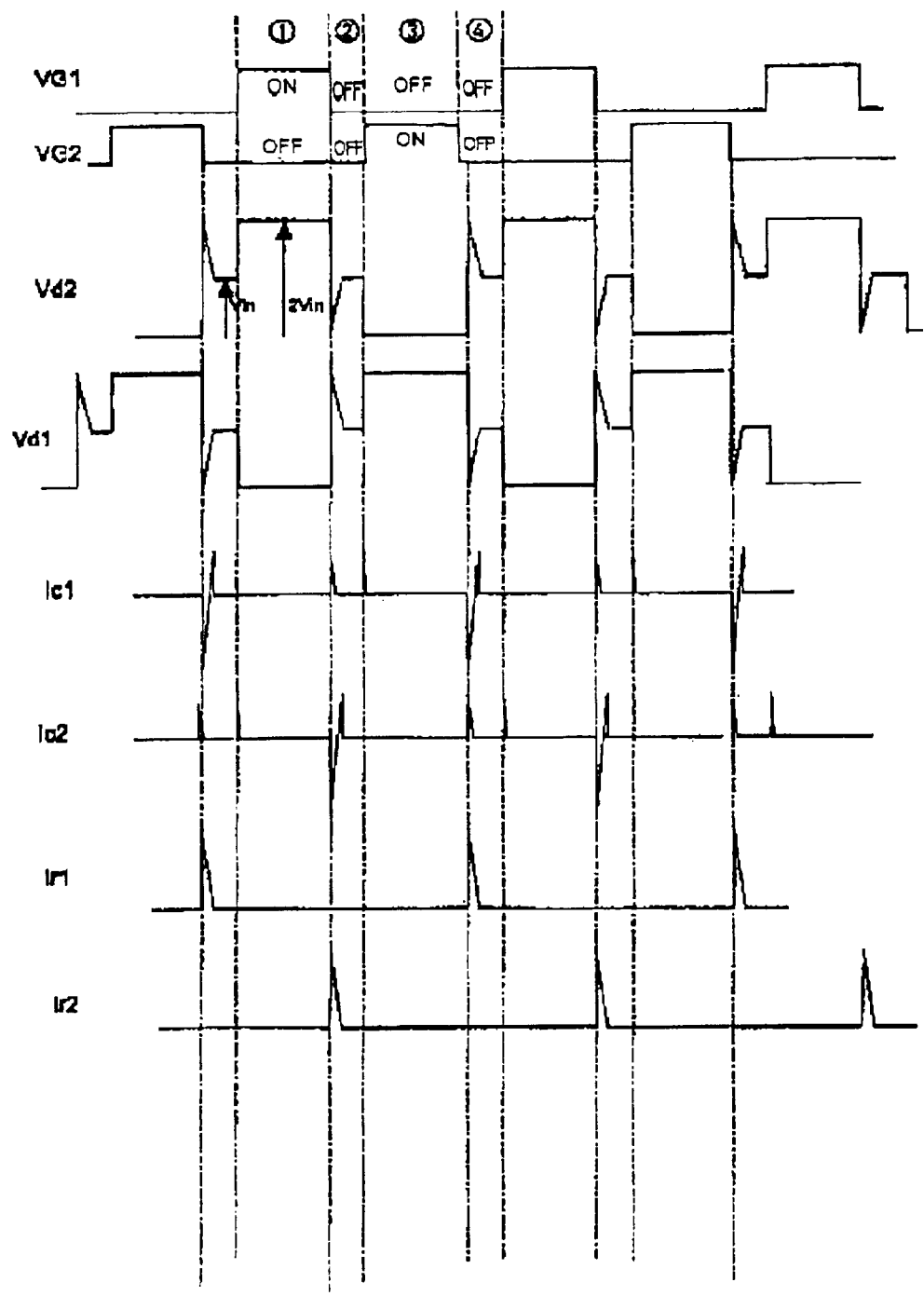

POWER REGENERATION CIRCUIT AND POWER CONVERSION SYSTEM

BACKGROUND OF THE INVENTION

1. Field of the Invention

This invention relates to a power regeneration circuit and a power conversion system.

2. Description of the Related Art

With reference to FIG. 7, a push-pull converter which is a kind of a power conversion system will be explained. In the push-pull converter shown, FET1 designates a first switching element, FET2 a second switching element, T a converter transformer, Vin a DC voltage source (for outputting a DC voltage Vin), D1, D2 rectification diodes, L a choke coil, and C1, C2 first and second smoothing capacitors.

SC1 designates a first snubber circuit connected between the source and the drain of the first switching element FET1, and SC2 a second snubber circuit connected between the source and the drain of the second switching element FET2.

Assume that this push-pull converter is not provided with the first and second snubber circuits SC1, SC2. In the case where the first and second switching elements FET1, FET2 turn off from on state, the current that has thus far flowed in the primary coil FN of the converter transformer T is reduced to zero instantaneously. Thus, a surge voltage (sharp voltage change) is generated between the source and the drain of the first and second switching elements FET1, FET2 due to the counter electromotive force generated by the leakage inductance of the primary coil FN of the converter transformer T. This surge voltage causes the breakdown or an increased operation loss of the first and second switching elements FET1, FET2. The first and second snubber circuits SC1, SC2 are provided for suppressing the surge voltage applied to the first and second switching elements FET1, FET2. Specifically, the first and second snubber circuits SC1, SC2 operate in such a manner as to reduce by absorbing the surge voltage generated between the source and the drain of the first and second switching elements FET1, FET2 due to the counter electromotive force.

An operation waveform of the essential parts of the push-pull converter is shown in FIG. 8. In FIG. 8, VG1 designates a gate voltage of the first switching element FET1, VG2 a gate voltage of the second switching element FET2, Vd2 a drain voltage of the second switching element FET2, Vd1 a drain voltage of the first switching element FET1, IS1 a snubber current of the first snubber circuit SC1, and IS2 a snubber current of the second snubber circuit SC2.

The first and second snubber circuits SC1, SC2 of the push-pull converter are configured of a series circuit including first and second snubber capacitors CO1, CO2 and snubber resistors RO1, RO2. In reducing the surge voltage, therefore, a considerable amount of power is consumed wastefully, thereby reducing the power conversion efficiency of the push-pull converter as a whole.

Further, a large snubber current flows in the first or second snubber circuit SC1, SC2 and a great amount of electric power is consumed wastefully when the first or second switching element FET1, FET2 turns off or when the second or first switching element FET2, FET1 turns on so that the source-drain voltage of the first or second switching element FET1, FET2 changes from Vin to 2Vin. This is another factor of reducing the overall power conversion efficiency of the push-pull converter.

SUMMARY OF THE INVENTION

Accordingly, an object of this invention is to suppress the surge voltage generated when the first or second switching element turns off from on state on the one hand and to reduce the energy loss accompanying the suppression of the surge voltage thereby to improve the power conversion efficiency on the other hand.

(1) According to a first aspect of the invention, there is provided a power regeneration circuit for a power conversion system comprising a converter transformer having an intermediate tap of the primary coil, a first switching element connected between an end of the primary coil of the converter transformer and the ground, a second switching element connected between the other end of the primary coil and the ground, and a smoothing capacitor connected in parallel to a DC voltage source between the intermediate tap of the primary coil of the converter transformer and the ground, the power regeneration circuit being used for power regeneration of the power conversion system to turn on/off the switching elements with an in-between period of turning off both the switching elements, the power regeneration circuit further comprising at least a charge/discharge element connected in parallel to the coil portion between one end of the primary coil and the intermediate tap, and a charge/discharge path forming a first closed circuit of the coil portion and the charge/discharge element in response to the transition of one of the switching elements connected to one end of the primary coil to off state, the charge/discharging path forming a second closed circuit of the coil portion, the charge/discharge element and the smoothing capacitor in response to the transition of the other switching element to off state.

In the description above and below, the term "connection" is defined as not only the manner in which elements are connected directly to each other as in the embodiments but also the manner in which elements are connected to each other indirectly through other elements as far as the power regeneration described above is possible. Thus, the connection which may be either direct or indirect, includes the state in which the first switching element is connected between an end of the primary coil of the converter transformer and the ground, the state in which the second switching element is connected between the other end of the primary coil and the ground, the state in which the DC voltage source is connected between the intermediate tap of the primary coil of the converter transformer and the ground, and the state in which the smoothing capacitor is connected in parallel to the DC voltage source.

The turning on of the first switching element or the second switching element is defined as the state in which the circuit is closed electrically, and the turning off thereof is defined as the state in which the circuit is opened electrically. In these cases, the first switching element or the second switching element includes not only an electrical element such as a transistor, a thyristor or a bidirectional diode, but also an element having a mechanical contact such as a relay contact or other mechanical contact which has the switching function.

The converter transformer may take any form as far as it has at least one intermediate tap on the primary coil side.

The DC voltage source should not be interpreted limitatively as a cell such as the primary cell or the secondary cell, but may take any form which generates a DC current. In this case, the DC voltage source may be either integrated with the power conversion system according to the invention or attached externally as an independent unit.

The charge/discharge element, which is a capacitor, may be any other device having the function of storing the charge.

The smoothing capacitor may be an element in any form having the smoothing function capable of conversion into the DC current by suppressing the voltage variation of the DC voltage source.

In the first aspect of the invention, the energy generated at an end portion of the converter transformer when the first and second switching elements turn off can be suppressed by charging the charge/discharge element, while the energy charged in the charge/discharge element can be charged in the smoothing capacitor. The energy charged in the smoothing capacitor can be reused as a current flowing in the converter transformer, thereby making it possible to remarkably improve the power conversion efficiency.

Preferably, the first closed circuit includes at least one conductive element connected between the charge/discharge element and the intermediate tap of the primary coil and adapted to conduct in response to the voltage increase at one end portion of the primary coil. The second closed circuit, on the other hand, includes at least one another conductive element connected between the joint between the charge/discharge element and the aforementioned conductive element and the ground side of the smoothing capacitor and adapted to conduct in response to the voltage drop across the joint.

(2) According to a second aspect of the invention, there is provided a power regeneration circuit for a power conversion system comprising a converter transformer having an intermediate tap of the primary coil, a first switching element connected between an end of the primary coil of the converter transformer and the ground, a second switching element connected between the other end of the primary coil and the ground, and a smoothing capacitor connected in parallel to a DC voltage source between the intermediate tap of the primary coil of the converter transformer and the ground, the power regeneration circuit being used for power regeneration of the power conversion system for turning on/off the two switching elements with an in-between period of turning off the switching elements, the power regeneration circuit further comprising a first charge/discharge element connected in parallel to a first coil portion between one end of the primary coil and the intermediate tap, a second charge/discharge element connected in parallel to a second coil portion between the other end of the primary coil and the intermediate tap, a first charge/discharge path forming a first closed circuit of the first coil portion and the first charge/discharge element in response to the transition of the first switching element to off state, the first charge/discharge path forming a second closed circuit of the first coil portion, the first charge/discharge element and the smoothing capacitor in response to the transition of the second switching element to off state, and a second charge/discharge path forming a third closed circuit of the second coil portion and the second charge/discharge element in response to the transition of the second switching element to off state, the second charge/discharge path forming a fourth closed circuit of the second coil portion, the second charge/discharge element and the smoothing capacitor in response to the transition of the first switching element to off state.

In the second aspect of the invention, the energy generated at one or the other end of the primary coil of the converter transformer when the first and second switching elements turn off from on state can be suppressed by charging the first and second charge/discharge elements. On the other hand, the energy charged in the first and second charge/discharge elements can be charged in the smoothing capacitor. The energy charged in the smoothing capacitor can be reused as a current flowing in the converter transformer, thereby making it possible to remarkably improve the power conversion efficiency.

Preferably, the first closed circuit includes a first conductive element connected between the first charge/discharge element and the intermediate tap of the primary coil and adapted to conduct in response to the voltage increase at one end of the primary coil, the second closed circuit includes a second conductive element connected between a first joint between the first charge/discharge element and the first conductive element and the ground side of the smoothing capacitor and adapted to conduct in response to the voltage drop across the first joint, the third closed circuit includes a third conductive element connected between the second charge/discharge element and the intermediate tap of the primary coil and adapted to conduct in response to the voltage increase at the other end of the primary coil, and the fourth closed circuit includes a fourth conductive element connected between a second joint between the second charge/discharge element and the third conductive element and the ground side of the smoothing capacitor and adapted to conduct in response to the voltage drop across the second joint.

Incidentally, a diode having the directivity of conduction is available as a conductive element making up the charge/discharge path. Nevertheless, the conductive element should not be limitatively interpreted as such a diode, but any element configuration, electrical or mechanical, can be employed which has such a function of conduction as to make up the charge/discharge path regardless of whether it has the directivity of conduction or not.

BRIEF DESCRIPTION OF DRAWINGS

FIG. 4 is a waveform diagram for explaining the operation of FIG. 3;

DESCRIPTION OF THE PREFERRED EMBODIMENTS

Figure 1:
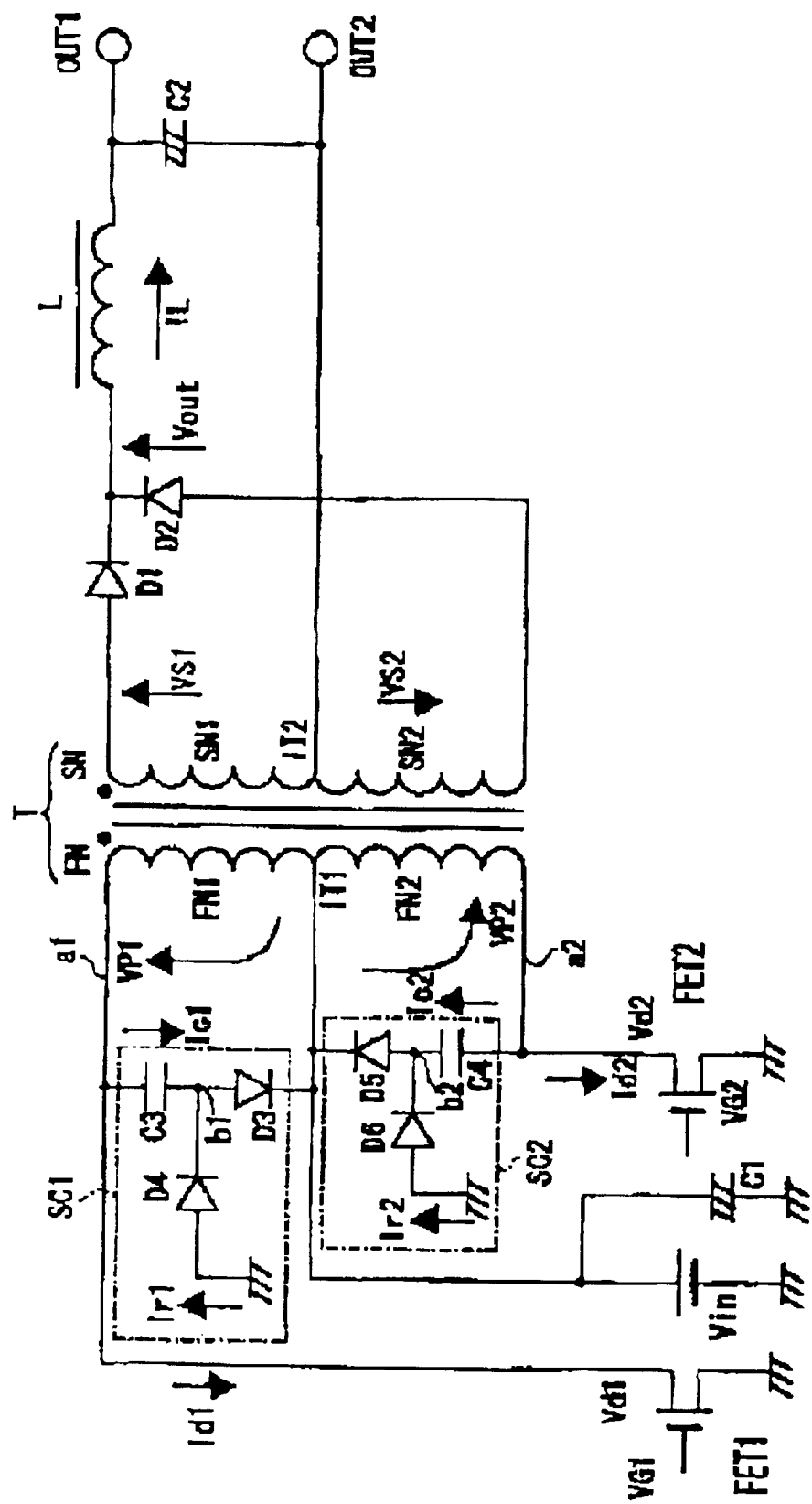
FIG. 1 is a circuit diagram of a push-pull converter according to an embodiment of the invention.

This invention will be described in detail below with reference to the embodiments shown in the drawings.

Figure 2:
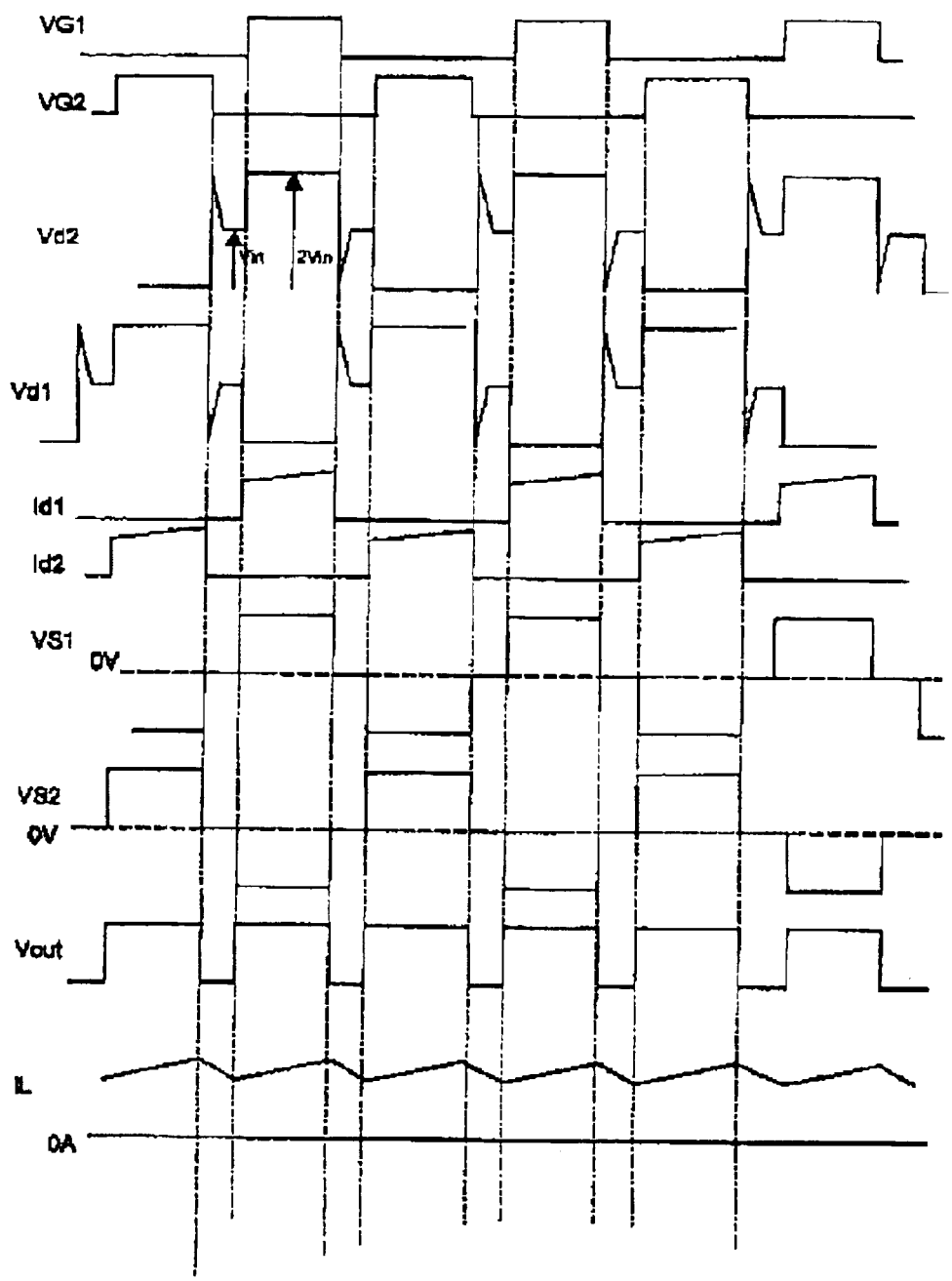
FIG. 2 is a diagram showing the operation waveforms of the circuit shown in FIG. 1.
Figure 7:
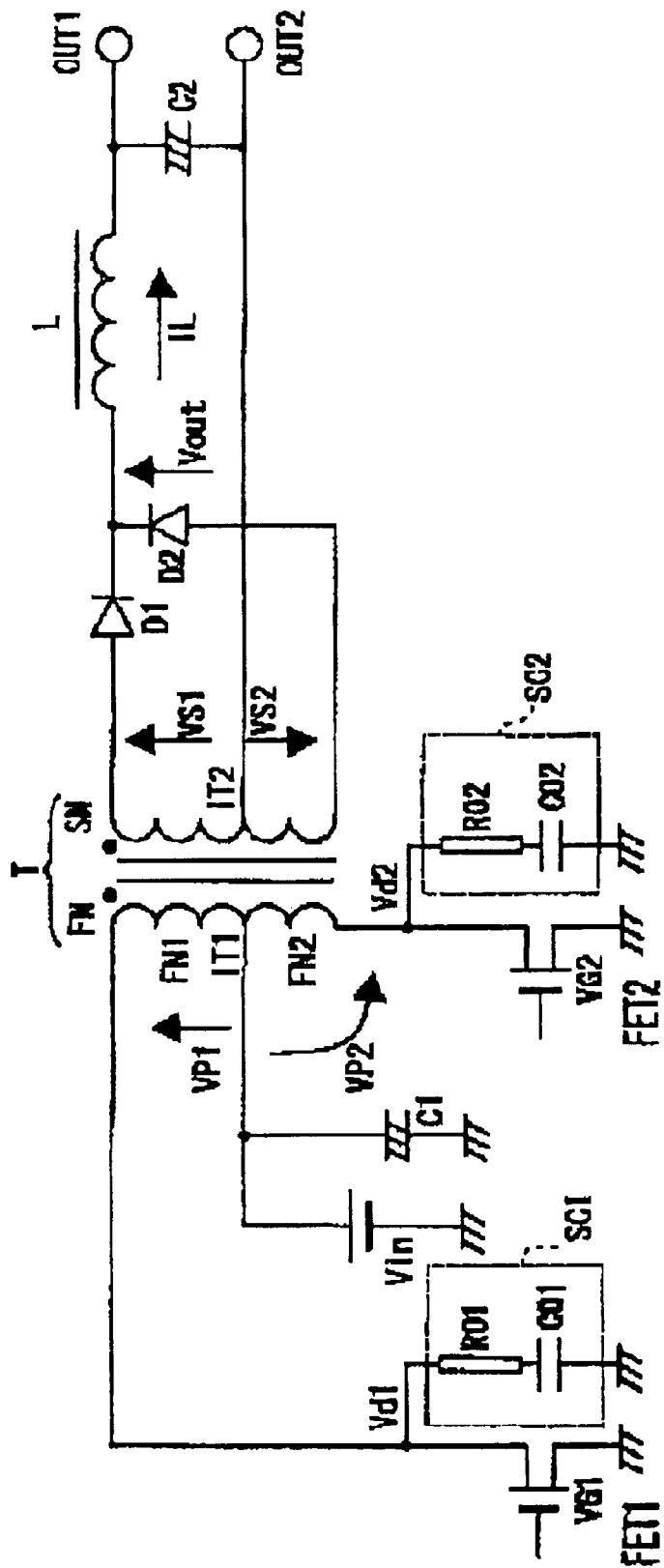
FIG. 7 is a circuit diagram showing the conventional push-pull converter.
Figure 8:
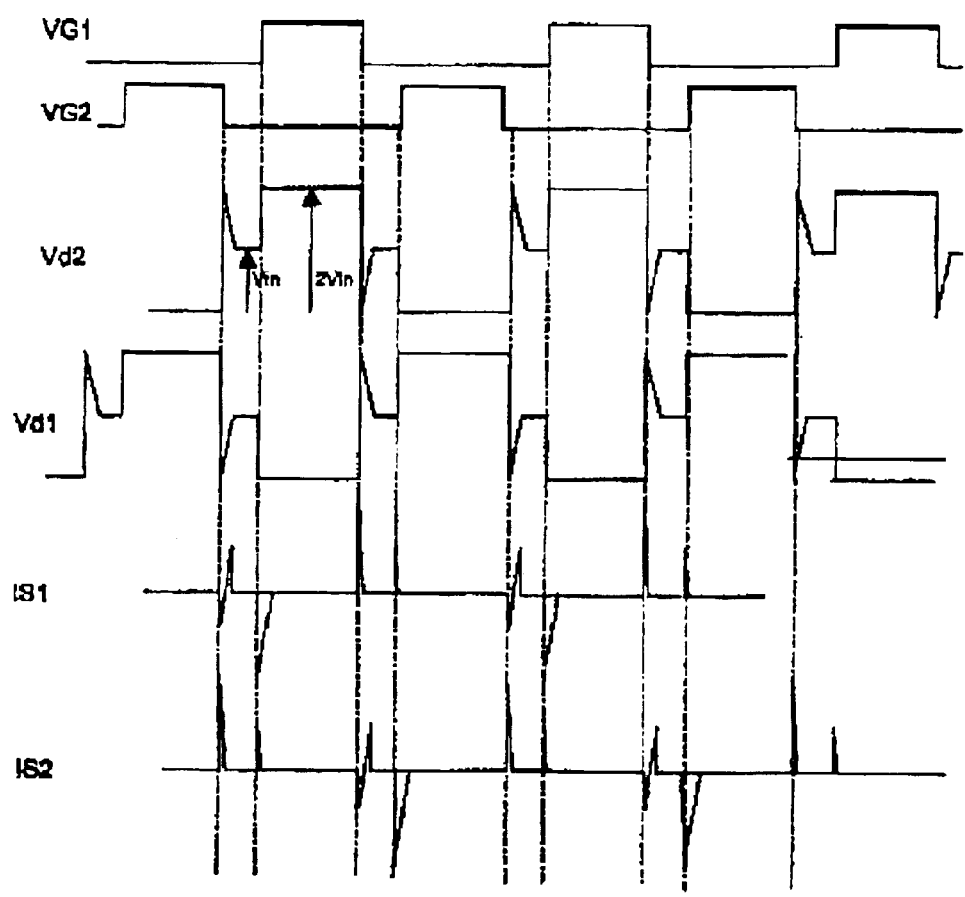
FIG. 8 is a diagram showing the operation waveforms of the circuit shown in FIG. 7.

FIG. 1 is a general circuit diagram showing a push-pull converter as a power conversion system according to an embodiment of the invention. FIG. 2 is a diagram showing the operating waveform of the push-pull converter as a whole shown in FIG. 1. FIG. 3 is a circuit diagram of the essential parts of the push-pull converter shown in FIG. 1. FIG. 4 is a diagram showing the operating waveform of the circuits of the essential parts shown in FIG. 3. In these diagrams, the component parts corresponding to those shown in FIGS. 7 and 8 are designated by the same reference numerals, respectively.

Referring to these diagrams, FET1 designates a first switching element, FET2 a second switching element, T a converter transformer, Vin a DC voltage source, D1, D2 rectification diodes, L a choke coil, C1 a first smoothing capacitor, and C2 a second smoothing capacitor.

The first switching element FET1, which is turned on by application of a high-level gate voltage VG1 thereto, is connected in series between one end a1 of the primary coil FN of the converter transformer T and the ground.

The second switching element FET2, which is adapted to be turned on by application thereto of the high-level gate voltage VG2, is connected in series between the other end a2 of the primary coil FN of the converter transformer T and the ground, The converter transformer T has the primary coil FN and the secondary coil SN. The primary coil FN of the converter transformer, in the presence of an intermediate tap IT1, has a coil portion FN1 from the intermediate tap IT1 to an end a1 and a coil portion FN2 from the intermediate tap IT1 to the other end a2. Incidentally, these coils are wound on the central leg of a pair of E-shaped ferrite cores in opposed relation to each other not shown. As a result, the energy stored in the inductance of the converter transformer T is mostly stored in the ferrite cores. As described later, therefore, regardless of which of the coil portion FN or FN2 of the primary coil FN is used to regenerate energy, the same energy stored in the ferrite cores is regenerated.

The DC voltage source Vin is connected between the intermediate tap IT1 of the converter transformer T and the ground. The positive pole of the DC voltage source Vin is connected to the intermediate tap IT1 and the negative pole thereof to the ground. The first smoothing capacitor C1 is connected in parallel to the DC voltage source Vin. In the primary coil FN of the converter transformer T, the number of turns of the first coil portion FN1 is equal to the number of turns of the second coil portion FN2.

The secondary coil SN of the converter transformer T also has an intermediate tap IT2. One and the other ends of the secondary coil SN of the converter transformer T are connected to each other through a first rectification diode D1 and a second rectification diode D2, respectively, on the one hand and connected to the output terminal OUT1 through a choke coil L on the other hand. The intermediate tap IT2 of the converter transformer T is connected to the other output terminal OUT2. The second smoothing capacitor C2 is connected in parallel between the two output terminals OUT1 and OUT2.

SC1 designates a first snubber circuit, and SC2 a second snubber circuit. The two snubber circuits SC1, SC2 make up a power regeneration circuit for the push-pull converter according to this embodiment. Incidentally, this power regeneration circuit can be called a surge voltage suppression circuit from the viewpoint of surge voltage suppression, and therefore according to this invention, is not limited in its naming.

The first snubber circuit SC1 includes a first snubber capacitor C3 as a first charge/discharge element connected in parallel to the coil portion FN1 of the primary coil FN of the converter transformer T, a first snubber diode D3 as a conductive element connected between the first snubber capacitor C3 and the intermediate tap IT1 and adapted to conduct in response to the voltage increase at one end a1 of the primary coil FN, and a second snubber diode D4 as a conductive element connected between a first joint b1 between the first snubber capacitor C3 and the first snubber diode D3 and the ground side (the ground side shared by the first smoothing capacitor C1, and all the ground sides mentioned hereinafter are the same ground side) and adapted to conduct in response to the voltage drop across the first joint b1. The first snubber diode D3 and the second snubber diode D4 make up a first charge/discharge path which charges the first snubber capacitor C3 with the energy stored in the primary coil FN when the first switching element FET1 turns off from on state and charges the first smoothing capacitor C1 with the charged energy when the second switching element FET2 turns off from on state.

The second snubber circuit SC2 includes a second snubber capacitor C4 as a second charge/discharge element connected in parallel to the coil portion FN2 of the primary coil FN of the converter transformer T, a third snubber diode D5 as a conductive element connected between the second snubber capacitor C4 and the intermediate tap IT1 and adapted to conduct in response to the voltage increase of the other end a2 of the primary coil FN, and a fourth snubber diode D6 as a conductive element connected between a second joint b2 between the second snubber capacitor C4 and the third snubber diode D5 and the ground side of the first smoothing capacitor C1 and adapted to conduct in response to the voltage drop across the second joint b2. The third snubber diode D5 and the fourth snubber diode D6 make up a second charge/discharge path which charges the second snubber capacitor C4 with the energy stored in the primary coil FN when the second switching element FET2 turns off from on state and charges the first smoothing capacitor C1 with the charged energy when the first switching element FET1 turns off from on state.

With reference to FIG. 2, the operation of the push-pull converter having the aforementioned configuration will be explained. In FIG. 2, VG1 designates a gate voltage of the first switching element FET1, VG2 a second gate voltage of the second switching element FET2, Vd2 a drain voltage of the second switching element FET2, Vd1 a drain voltage of the first switching element FET1, Id1 a drain current of the first switching element FET1, Id2 a drain current of the second switching element FET2, VS1 a voltage at one end of the secondary coil SN of the converter transformer T, VS2 a voltage at the other end of the secondary coil SN of the converter transformer T, Vout the output voltage between the output terminals OUT1, OUT2, and IL the output current flowing in the choke coil L. The high level of the waveform indicates an active state.

The first switching element FET1 and the second switching element FET2 turn on in response to the rise to high level of the first gate voltage VG1 and the second gate voltage VG2, respectively, applied to the gates of the respective switching elements. The first switching element FET1 and the second switching element FET2 turn off in response to the drop to low level of the first gate voltage VG1 and the second gate voltage VG2, respectively, applied to the gates of the respective switching elements. In this way, the first switching element FET1 and the second switching element FET2 operate in response to the change of the first gate voltage VG1 and the second gate voltage VG2, respectively, shown in FIG. 2. In other words, in FIG. 2, the first switching element FET1 and the second switching element FET2 turn off alternately except during an intermediate period when both are off.

The case in which both the first switching element FET1 and the second switching element FET2 are off. In the primary coil FN of the converter transformer T, assume that the voltage across the coil portion FN1 from the intermediate tap IT1 to an end a1 thereof is designated by Vp1 and the voltage across the coil portion FN2 from the intermediate tap IT1 of the primary coil FN of the converter transformer T to the other end a2 is designated by Vp2.

Then, the drain currents Id1, Id2 fail to flow in the first switching element FET1 and the second switching element FET2. Therefore, the drain voltages Vd1, Vd2 thereof assume the value of the DC voltage source Vin, i.e., the relation holds Vd1=Vd2=Vin.

Next, an explanation will be given about the case in which the first switching element FET1 turns on after the off period of both the first switching element FET1 and the second switching element FET2. In the process, the drain voltage Vd1 of the first switching element FET1 is zero. Therefore, the coil voltage Vp1 assumes −Vin, while the other coil voltage Vp2 assumes the polarity reverse to the coil voltage Vp1, with the result that −Vp1=Vin. In other words, the drain voltage Vd2 of the second switching element FET2 is given as Vin+Vp2=Vin+Vin=2Vin.

The reverse is true in the case where the second switching element FET2 turns on after the off period of both the first switching element FET1 and the second switching element FET2. In other words, the drain voltage Vd1 of the first switching element FET1 becomes 2Vin. At the same time, the drain voltage Vd1 of the second switching element FET2 is zero.

In this way, the drain voltages Vd1, Vd2 of the first switching element FET1 and the second switching element FET2 are changed to zero, Vin, 2Vin, and the drain currents Id1, Id2 also flow in a corresponding manner.

The coil voltages VS1, VS2 of the secondary coil SN of the converter transformer T, after being rectified by the rectification diodes D1, D2, are smoothed by the choke coil L and the second smoothing capacitor C2, and output as an output voltage Vout between the output terminals OUT1, OUT2. In the process, the output current IL flowing through the choke coil L undergoes a change as shown in FIG. 2.

In FIG. 2, when the first switching element FET1 and the second switching element FET2 turn off from on state, the drain voltages Vd1, Vd2 thereof overshoot. In the case where only the first switching element FET1 turns on from the state where the first switching element FET1 and the second switching element FET2 are both off, for example, the current of the DC voltage source Vin passes through the primary coil FN of the converter transformer T and further flows to the ground through the source-drain circuit of the first switching element FET1. In the process, the energy corresponding to the current flow is stored in the inductance component of the coil portion FN1. As a result, the first switching element FET1 turns off from on state, and the moment the first switching element FET1 and the second switching element FET2 are both about to turn off, the energy stored in the inductance component of the coil portion FN1 tends to be discharged by generating a high voltage. Since the first switching element FET1 and the second switching element FET2 both turn off, however, the drain current Id1, Id2 do not flow, and therefore the drain voltages Vd1, Vd2 should assume the value of the DC voltage source Vin, i.e. the relation should hold Vd1=Vd2=Vin. However, the drain voltage Vd1 of the first switching element FET1 overshoots above the value Vin due to the energy generated. On the other hand, the coil portion FN2 generates the same magnitude of the voltage in the polarity opposite to the coil portion FN1, with the result that the drain voltage Vd2 of the second switching element FET2 undershoots. This overshoot is actually difficult to suppress completely. FIG. 2 shows the state in which the overshoot amount is suppressed by the snubber circuits SC1, SC2 according to this embodiment, i.e., it is suppressed to not higher than 2Vin where the first switching element FET1 and the second switching element FET2 are not broken down.

Figure 3A:
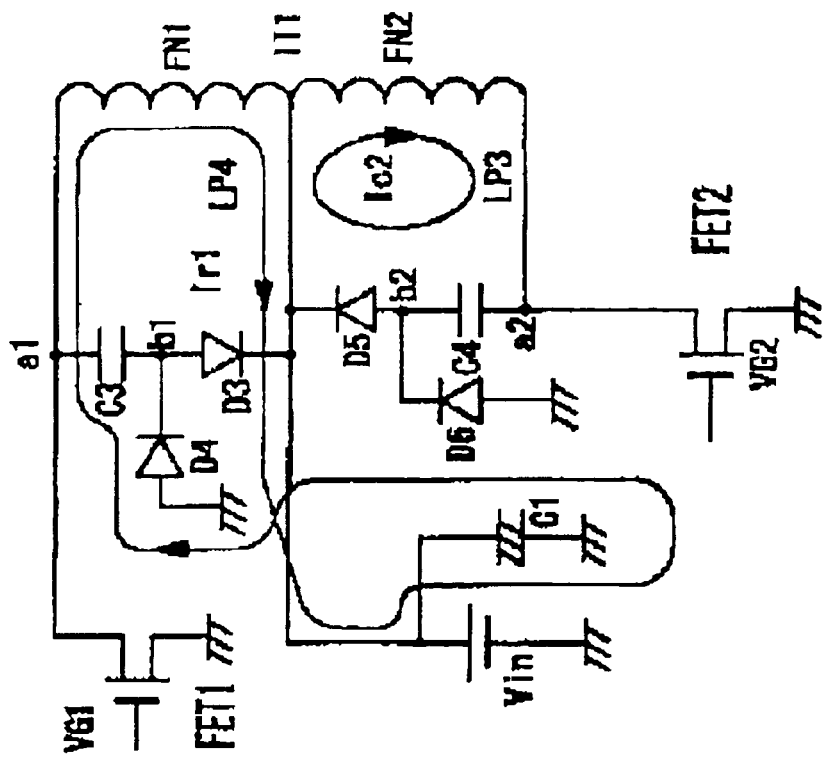
FIGS. 3A and 3B are diagrams for explaining the operation of the essential parts of FIG. 1, in which 3A concerns a case in which the first snubber capacitor of the first snubber circuit is charged while the second snubber capacitor of the second snubber circuit is discharged, and 3B concerns a case in which the first snubber capacitor of the first snubber circuit is discharged while the second snubber capacitor of the second snubber circuit is charged.
Figure 3B:
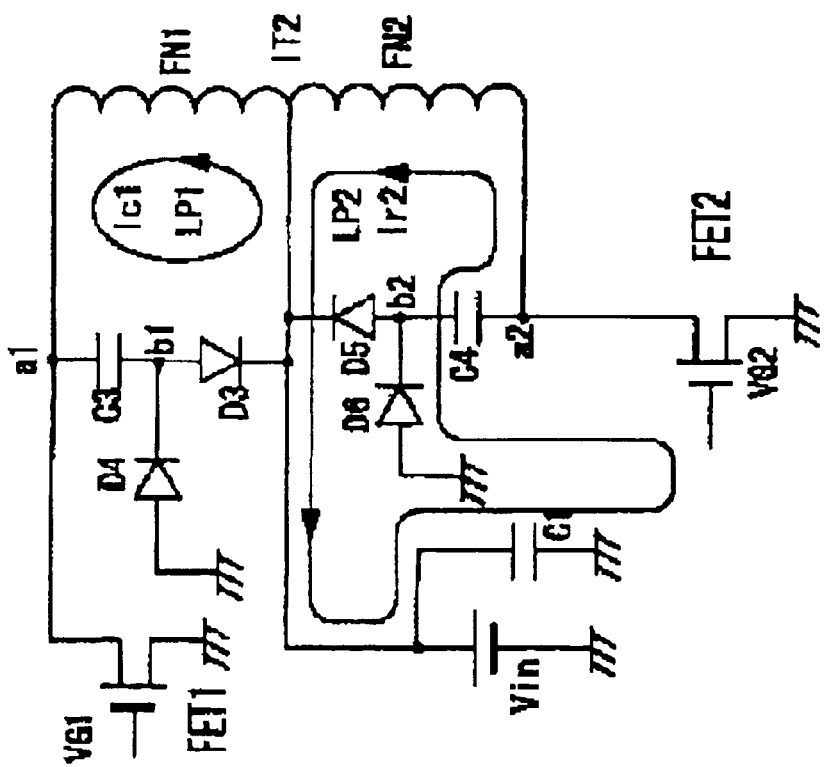

Next, with reference to FIGS. 1, 2 and especially FIGS. 3A, 3B and 4, the operation of the first and second snubber circuits SC1, SC2 according to this embodiment will be explained. FIG. 3A shows a charge/discharge path of the essential parts in the case where the first switching element FET1 turns off from on state, and FIG. 3B a charge/discharge path of the essential parts in the case where the second switching element FET2 turns off from on state.

In FIG. 4, VG1, VG2, Vd1, Vd2 designate the same voltage waveforms as described above, which undergo the same change as described above and therefore will not be described below. Ic1 designates a current flowing in the first snubber capacitor C3 of the first snubber circuit SC1, Ic2 a current flowing in the second snubber capacitor C4 of the second snubber circuit SC2, Ir1 a current flowing in the second snubber diode D4 of the first snubber circuit SC1, and Ir2 a current flowing in the fourth snubber diode D6 of the second snubber circuit SC2.

(1) When the first switching element FET1 is on while the second switching element FET2 is off (period [1] in FIG., 4).

During the period [1] when the first gate voltage VG1 rises to high level so that the first switching element FET1 turns on while the second gate voltage VG2 drops to low level thereby to turn off the second switching element FET2, the drain voltage Vd1 of the first switching element FET1 becomes zero while the drain voltage of the second switching element FET2 becomes 2Vin.

Under this condition, the second snubber capacitor C4 of the second snubber circuit SC2 is charged with Vc2=Vin.

This charge operation will be explained. In the state before the period [1] where the first switching element FET1 and the second switching element FET2 are both off, the drain voltages Vd1, Vd2 are both at Vin. Under this condition, the moment the first switching element FET1 rises to on from off state and shifts to the period [1], the drain voltage Vd1 of the first switching element FET1 becomes zero, while the drain voltage Vd2 of the second switching element FET2 becomes 2Vin. As a result, the second snubber capacitor C4 of the second snubber circuit SC2 is charged to Vc2=Vin by the current Ic2 flowing in the direction of arrow in FIG. 1. In this case, the second snubber capacitor C4 is charged in such a direction that one electrode thereof, i.e., the other end a2 of the primary coil FN of the converter transformer T assumes a high potential.

(2) when the second switching element FET2 is kept off while the first switching element FET1 turns off from on state described in (1) (at the time of shift from period [1] to period [2]).

At the instant of this shift, for the reason described above, the drain voltage Vd1 of the first switching element FET1 overshoots and tends to change to a voltage of 2Vin or higher, while the drain voltage Vd2 of the second switching element FET2 undershoots to about zero.

As a result, the voltage at one end a1 of the primary coil FN of the converter transformer T rises to high level, so that the first snubber diode D3 of the first snubber circuit SC1 begins to conduct. As a result, a charge path (closed circuit) LP1 in the direction of arrow shown in FIG. 3A is formed of the first coil portion FN1 of the converter transformer T, the first snubber capacitor C3 and the first snubber diode D3. The first snubber capacitor C3 is charged with the charge current Ic1 in the charge path LP1.

On the other hand, the second snubber capacitor C4 of the second snubber circuit SC2 is charged to Vc2=Vin. When the voltage at the other end a2 of the primary coil FN drops to about zero due to the undershoot, therefore, the voltage at the other electrode of the second snubber capacitor C4, i.e., the voltage across the joint b2 drops to −Vin. As a result, the fourth snubber diode D6 begins to conduct, so that a discharge path (closed circuit) LP2 in the direction of arrow shown in FIG. 3A is similarly formed of the second snubber capacitor C4, the second coil portion FN2, the first smoothing capacitor C1, the fourth snubber diode D6 and the second snubber capacitor C4. Thus, a current Ir2 flows into the second snubber capacitor C4 through the fourth snubber diode C6, thereby discharging the second snubber capacitor C4. Consequently, the overshoot of the drain voltage Vd1 of the first switching element FET1 is suppressed by a voltage at which the first switching element FET1 is free of breakdown. At the same time, the suppressed surge voltage is regenerated as energy in the first smoothing capacitor C1.

This energy regeneration will be explained in more detail.

The first snubber circuit SC1 and the second snubber circuit SC2 are not intended to eliminate the surge voltage completely, but to suppress the surge voltage to not higher than the withstanding voltage of the first switching element FET1 and the second switching element FET2, respectively. In the conventional snubber circuit configured of a snubber resistor and a snubber capacitor in series, most of the charge and discharge current of the snubber capacitor are converted into thermal energy and consumed by the snubber resistor. This consumed energy constitutes wasteful power consumption and reduces the power conversion efficiency.

(3) Period [2] after transition of state (2) above

During this period [2], both the first gate voltage VG1 and the second gate voltage VG2 are reduced to low level, so that both the first switching element FET1 and the second switching element FET2 turn off. Also, during this period [2], the drain voltage Vd1 of the first switching element FET1 and the second switching element FET2 are both Vin.

(4) Period [3] after state (3) above

During this period, the reverse to the period [1] of state (1) is true, and the second gate voltage VG2 rises to high level. The second switching element FET2 turns on, and the drain voltage Vd2 of the second switching element FET2 becomes zero, while the drain voltage Vd1 of the first switching element FET1 becomes 2Vin. Under this condition, the first snubber capacitor C3 of the first snubber circuit SC1 is charged to Vc2=Vin.

(5) When the first switching element FET1 is kept off, and the second switching element FET2 turns off from on state of (4) (transition from period [3] to period [4]).

In this case, the operation is reverse to the state (2) above. Specifically, the drain voltage Vd1 of the second switching element FET2 overshoots and tends to change to a voltage higher than 2Vin, while the drain voltage Vd2 of the first switching element FET1 undershoots to about zero.

As a result, the voltage at the other end a2 of the primary coil FN of the converter transformer T rises to high level, and the second snubber diode D5 of the second snubber circuit SC1 begins to conduct. Thus, a charge path (closed circuit) LP3 in the direction of arrow in FIG. 3B is formed of the coil portion FN2 of the converter transformer T, the second snubber capacitor C4 and the third snubber diode D5. In this way, the second snubber capacitor C4 is charged by the charge current Ic2.

On the other hand, the first snubber capacitor C3 of the first snubber circuit SC1 is charged to Vc1=Vin. Therefore, when the voltage at one end a1 of the primary coil FN drops to about zero by an undershoot, the voltage of the other electrode of the first snubber capacitor C3, i.e. the voltage across the joint b1 drops to −Vin. As a result, the second snubber diode D4 begins to conduct. Thus, a discharge path (closed circuit) LP4 in the direction of arrow as shown in FIG. 3B is formed of the first snubber capacitor C3, the first coil portion FN1, the first smoothing capacitor C1 and the second snubber diode D4. In this way, a current Ir1 flows into the first snubber capacitor C3 through the second snubber diode D4, so that the first snubber capacitor C3 is discharged and this discharge energy is charged into the first smoothing capacitor C1. Consequently, the overshoot of the drain voltage Vd2 of the second switching element FET2 is suppressed to such a voltage as not breaking down the second switching element FET2, while at the same time the suppressed surge voltage is regenerated as energy in the first smoothing capacitor C1.

According to this embodiment, the discharge current from the first snubber capacitor C3 and the second snubber capacitor C4 of the first snubber circuit SC1 and the second snubber circuit SC2, respectively, are charged to the first smoothing capacitor C1. The charge stored in the first smoothing capacitor C1 is reused as a current flowing in the converter transformer T on the next occasion when the first switching element FET1 or the second switching element FET2 turns on.

As described above, according to this embodiment, the instant the first switching element FET1 or the second switching element FET2 turns off from on state, the overshoot of the drain voltage Vd1, Vd2 thereof is suppressed below a predetermined voltage, while at the same time regenerating the suppressed voltage as energy, thereby improving the power conversion efficiency.

Figure 5:
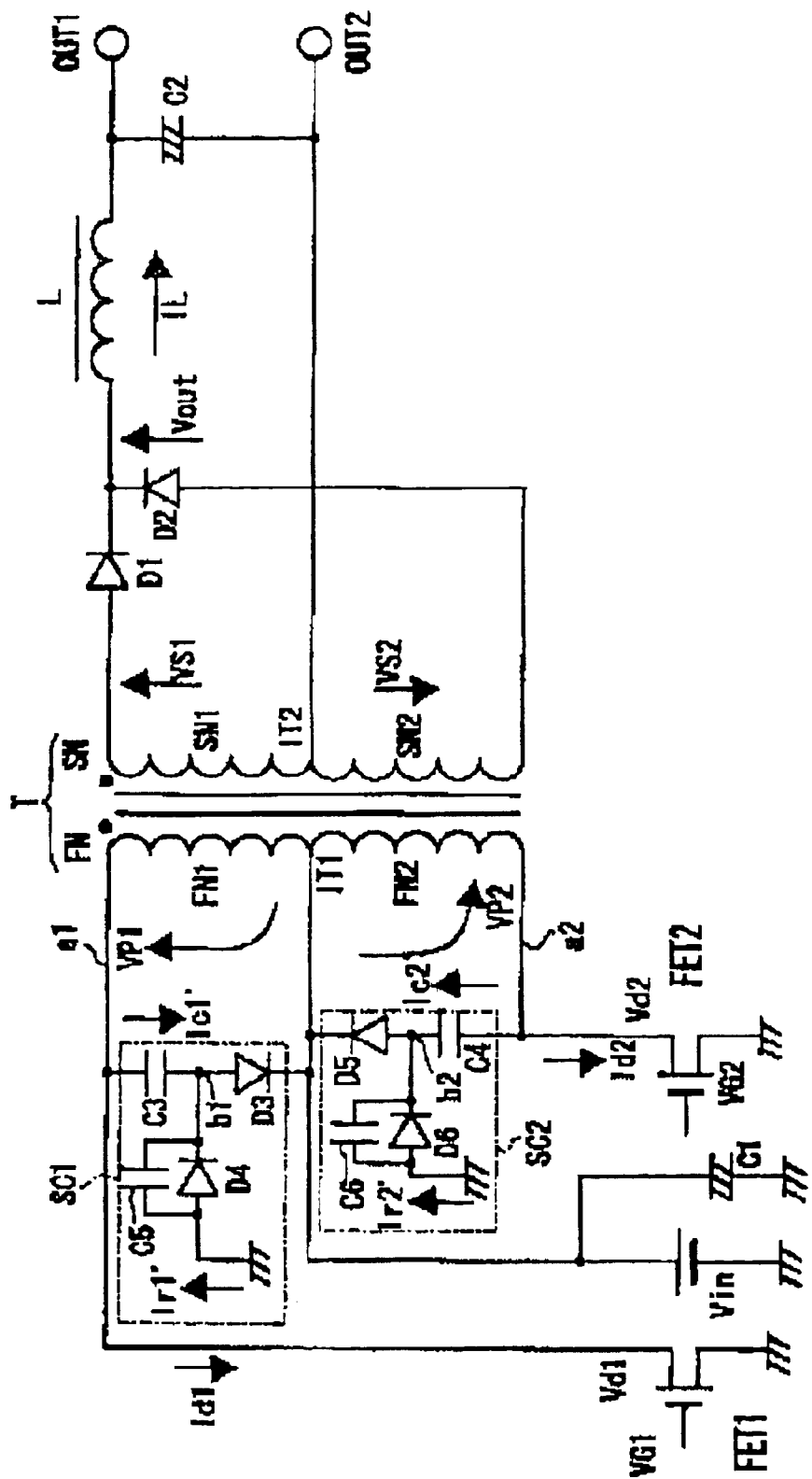
FIG. 5 is a circuit diagram showing a push-pull converter according to another embodiment of the invention.
Figure 6:
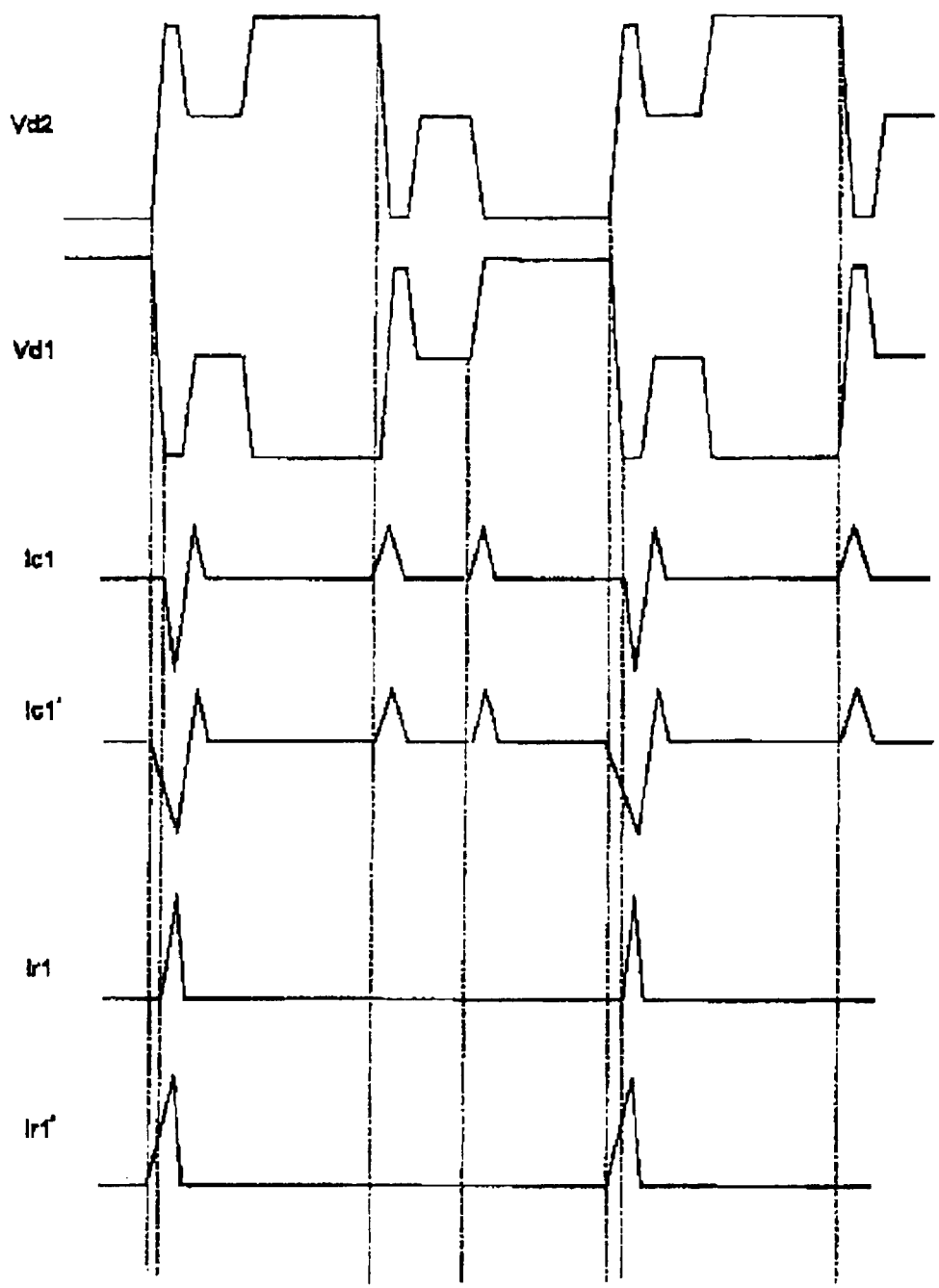
FIG. 6 is a waveform diagram for explaining the operation in FIG. 5.

FIG. 5 is a general circuit diagram showing a push-pull converter according to another embodiment of the invention, and FIG. 6 shows operation waveforms in enlarged form of the essential parts of the circuit shown in FIG. 5. In FIG. 5, the component parts corresponding to those in FIG. 1 are designated by the same reference numerals, respectively, and will not be described below. The configuration constituting the feature of this embodiment lies in that a capacitor is connected in parallel to each of the second snubber diode and the fourth snubber diode of the first snubber circuit SC1 and the second snubber circuit SC2, respectively.

In FIG. 6, Ic1, Ic1' designate the current flowing in the first snubber capacitor C3 of the first snubber circuit SC1 in FIGS. 1 and 4, respectively, and Ir1, Ir1' the current flowing in the second snubber diode D3 of the first snubber circuit SC1 in FIGS. 1 and 4, respectively. Though not shown in FIG. 6, the current Ic2' flowing in the second snubber capacitor C4 of the second snubber circuit SC2 shown in FIG. 5 is 180 degrees out of phase from the current Ic1', while the current Ir2' flowing in the fourth snubber diode D6 of the second snubber circuit SC2 shown in FIG. 5 is 180 degrees out of phase from the current Ir1'.

In the circuit of FIG. 5, the instant the first switching element FET1 and the second switching element FET2 turn off from on state, the current Ir1', Ir2', respectively, for energy regeneration begin to flow, resulting in a correspondingly faster suppression of the surge voltage. For this reason, a MOSFET having a superior performance is desirably used for the first switching element FET1 and the second switching element FET2.

According to this invention, the energy loss is reduced for suppressing the surge voltage thereby to improve the power conversion efficiency.

What is claimed is:

1. A power regeneration circuit for a power conversion system comprising a converter transformer having an intermediate tap of the primary coil, a first switching element connected between an end of the primary coil of the converter transformer and the ground, a second switching element connected between the other end of the primary coil and the ground, and a smoothing capacitor connected in parallel to a DC voltage source between the intermediate tap of the primary coil of the converter transformer and the ground, the power regeneration circuit being used for power regeneration of the power conversion system for turning on/off the switching elements alternately with an in-between period of turning off the switching elements, the power regeneration circuit further comprising at least a charge/discharge element connected in parallel to the coil portion between one end of the primary coil and the intermediate tap, and a charge/discharge path forming a first closed circuit of the coil portion and the charge/discharge element in response to the transition of one of the switching elements connected to one end of the primary coil to off state, the charge/discharge path forming a second closed circuit of the coil portion, the charge/discharge element and the smoothing capacitor in response to the transition of the other switching element to off state.

2. A power regeneration circuit according to claim 1, wherein the first closed circuit includes at least one conductive element connected between the charge/discharge element and the intermediate tap of the primary coil and adapted to conduct in response to the voltage increase at one end of the primary coil, and the second closed circuit includes at least another conductive element connected between the joint between the charge/discharge element and the conductive element and the ground side of the smoothing capacitor and adapted to conduct in response to a voltage drop of the joint.

3. A power regeneration circuit for a power conversion system comprising a converter transformer having an intermediate tap of the primary coil, a first switching element connected between an end of the primary coil of the converter transformer and the ground, a second switching element connected between the other end of the primary coil and the ground, and a smoothing capacitor connected in parallel to a DC voltage source between the intermediate tap of the primary coil of the converter transformer and the ground, the power regeneration circuit being used for power regeneration of the power conversion system for turning on/off the switching elements alternately with an in-between period of turning off the switching elements, the power regeneration circuit further comprising at least a first charge/discharge element connected in parallel to a first coil portion between one end of the primary coil and the intermediate tap, a second charge/discharge element connected in parallel to a second coil portion between the other end of the primary coil and the intermediate tap, a first charge/discharge path forming a first closed circuit of the first coil portion and the first charge/discharge element in response to the transition of the first switching element to off state, the charge/discharge path forming a second closed circuit of the first coil portion, the first charge/discharge element and the smoothing capacitor in response to the transition of the second switching element to off state, and a second charge/discharge path forming a third closed circuit of the second coil portion and the second charge/discharge element in response to the transition of the second switching element to off state, the second charge/discharge path forming a fourth closed circuit between the second coil portion, the second charge/discharge element and the smoothing capacitor in response to the transition of the first switching element to off state.

4. A power regeneration circuit according to claim 3, wherein the first closed circuit includes a first conductive element connected between the first charge/discharge element and the intermediate tap of the primary coil and adapted to conduct in response to the voltage increase at one end of the primary coil, the second closed circuit includes a second conductive element connected between a first joint between the first charge/discharge element and the first conductive element and the ground side of the smoothing capacitor and adapted to conduct in response to the voltage drop across the first joint, the third closed circuit includes a third conductive element connected between the second charge/discharge element and the intermediate tap of the primary coil and adapted to conduct in response to the voltage increase at the other end of the primary coil, and the fourth closed circuit includes a fourth conductive element connected between a second joint between the second charge/discharge element and the third conductive element and the ground side of the smoothing capacitor and adapted to conduct in response to the voltage drop across the second joint.

5. A power conversion system comprising a converter transformer having an intermediate tap of the primary coil, a first switching element connected to an end of the primary coil of the converter transformer, a second switching element connected to the other end of the primary coil, and a smoothing capacitor connected in parallel to a DC voltage source connected to the intermediate tap of the primary coil of the converter transformer, the power conversion system turning on/off the switching elements alternately with an in-between period of turning off both the switching elements, the power conversion system further comprising a first charge/discharge element connected in parallel to a first coil portion between one end of the primary coil and the intermediate tap, a second charge/discharge element connected in parallel to a second coil portion between the other end of the primary coil and the intermediate tap, a first charge/discharge path forming a first closed circuit of the first coil portion and the first charge/discharge element in response to the transition of the first switching element to off state, the first charge/discharg path forming a second closed circuit of the first coil portion, the first charge/discharge element and the smoothing capacitor in response to the transition of the second switching element to off state, and a second charge/discharge path forming a third closed circuit of the second coil portion and the second charge/discharge element in response to the transition of the second switching element to off state, the second charge/discharge path forming a fourth closed circuit of the second coil portion, the second charge/discharge element and the smoothing capacitor in response to the transition of the first switching element to off state.

6. A power conversion system according to claim 5, wherein the first closed circuit includes a first conductive element connected between the first charge/discharge element and the intermediate tap of the primary coil and adapted to conduct in response to the voltage increase at one end of the primary coil, the second closed circuit includes a second conductive element connected between a first joint between the first charge/discharge element and the first conductive element and the ground side of the smoothing capacitor and adapted to conduct in response to the voltage drop of the first joint, the third closed circuit includes a third conductive element connected between the second charge/discharge element and the intermediate tap of the primary coil and adapted to conduct in response to the voltage increase at the other end of the primary coil, and the fourth closed circuit includes a fourth conductive element connected between a second joint between the second charge/discharge element and the third conductive element and the ground side of the smoothing capacitor and adapted to conduct in response to the voltage drop of the second joint.

* * * * *